United States Patent
Bennett et al.

(10) Patent No.: US 6,906,900 B2
(45) Date of Patent: Jun. 14, 2005

(54) STRUCTURE AND METHOD OF THERMALLY PROTECTING POWER DEVICES FOR AIRBAG DEPLOYMENT

(75) Inventors: Paul T. Bennett, Phoenix, AZ (US); Victor A. Chiriac, Phoenix, AZ (US); Tien-Yu Tom Lee, Phoenix, AZ (US); David D. Putti, Novi, MI (US); William E. Edwards, Ann Arbor, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 356 days.

(21) Appl. No.: 10/324,219

(22) Filed: Dec. 19, 2002

(65) Prior Publication Data

US 2004/0120382 A1 Jun. 24, 2004

(51) Int. Cl.$^7$ ................................................. H02H 9/00
(52) U.S. Cl. ................................................. 361/57; 701/45
(58) Field of Search ........................... 361/89, 57, 37; 307/10.1; 701/45

(56) References Cited

U.S. PATENT DOCUMENTS

| | | | |
|---|---|---|---|
| 5,005,008 A | * | 4/1991 | King ........................ 340/653 |
| 5,420,790 A | | 5/1995 | Ravas, Jr. et al. |
| 5,432,385 A | | 7/1995 | Kincaid et al. |
| 5,459,449 A | | 10/1995 | Ravas, Jr. et al. |
| 5,461,358 A | | 10/1995 | Ravas, Jr. et al. |
| 5,666,065 A | | 9/1997 | Ravas et al. |
| 5,701,038 A | | 12/1997 | Kincaid |
| 5,796,177 A | | 8/1998 | Werbelow et al. |
| 5,845,729 A | | 12/1998 | Smith et al. |
| 5,872,460 A | | 2/1999 | Bennett et al. |
| 5,899,949 A | | 5/1999 | Kincaid |
| 5,964,816 A | | 10/1999 | Kincaid |
| 6,046,511 A | | 4/2000 | Kincaid |
| 6,175,299 B1 | | 1/2001 | Manlove et al. |

\* cited by examiner

*Primary Examiner*—Stephen W. Jackson
*Assistant Examiner*—Boris Benenson
(74) *Attorney, Agent, or Firm*—Robert L. King; Tyson Y. Winarski

(57) ABSTRACT

System and method protects power drivers (10) and (12) that are used for airbag deployment. Temperature sensors (38) are strategically located on the integrated circuit (36) to detect temperature levels in power drivers (10) and (12). When the temperature in the power drivers (10) and (12) reaches a maximum level, an output is provided to logic block (26). Current detecting circuit (24) provides an output when the current flowing in power driver (10) reaches a desired level. Timing circuit (28) is activated when it receives the output from current detecting circuit (24). At the expiration of the time, timing circuit (28) provides an output to logic block (26). When logic block (26) receives both outputs, logic block (26) shuts drivers (10) and (12) down. When temperature sensors (38) detects that the temperature in integrated circuit (36) has reached a minimum level, logic block (26) reactivates drivers (10) and (12).

21 Claims, 4 Drawing Sheets

STRUCTURE AND METHOD OF THERMALLY PROTECTING POWER DEVICES FOR AIRBAG DEPLOYMENT

TECHNICAL FIELD OF THE INVENTION

The present invention relates to the field of solid state electronics and, in more particular, to a method and system for thermally protecting power devices during events that require a high peak power pulse for a short period of time.

BACKGROUND OF THE INVENTION

Numerous applications require a power driver to provide a high peak power pulse for a short period of time. One such application is the deployment of automobile airbags. The deployment of airbags is regulated by a control system supported on an integrated circuit. Power drivers fabricated on the integrated circuit provide a high peak power pulse for a short period of time to a device located in the airbag called a squib. The squib is a wire that acts as the trigger for deploying the airbag. Through providing a high peak power pulse for a short period of time to the squib, the power pulse thermally destroys the squib causing the deployment of the airbag.

Proper deployment of the automobile airbag is required for the system to protect the lives of the vehicle occupants. Proper deployment of the airbag includes full deployment of the airbag at precisely the desired time during an accident. Proper deployment requires that the power drivers provide a sufficient amount of power for a sufficient amount of time to the squib to cause its thermal destruction. Unfortunately, however, over time, through normal operation of an automobile, damage can occur to an airbag system that prevents proper deployment of the airbag. Typical points of failure in the airbag system include a damaged wiring harness, damaged electrical components, short circuits and open circuits in the system. In addition to preventing any deployment of the airbag, these system defects can also cause a premature deployment, late deployment, and inadvertent deployment of the airbag system. These types of faulty airbag deployments can result in greater injury to the vehicle occupants than if the airbag had never deployed in the first place.

One method of ensuring that a large enough power pulse is provided for a long enough period of time to destroy the squib is through over-sizing the power drivers located on the integrated circuit. Through over-sizing the power devices, it is possible to provide an excessive pulse of current for an excessive amount of time in order to ensure the proper deployment of the squib. However, this solution has a financial drawback.

Over-sizing the power drivers on the integrated circuit greatly increases the cost of the system. Over-sized power drivers consume a large amount of surface area on the integrated circuit. As a result, it is necessary to increase the size of the integrated circuit. Consequently, the material costs are greatly increased. It is highly desirable to produce an optimal power driver that provides an optimal power pulse to the squib. In this manner, it is possible to optimize the size of the power devices and correspondingly reduce the cost of the device.

When an airbag fails to deploy, or deploys improperly, it is highly desirable to determine the cause. Through determining the root cause of the failed or faulty deployment, it is possible to ensure that in the future that the airbag system functions properly and meet its safety function. In order to reconstruct the root cause of the failed or faulty deployment, it is desirable to ensure that all electrical components in the airbag system remain intact after the failure to facilitate post-failure analysis. In order to conduct a post-failure airbag system analysis, it is desirable to ensure that the integrated circuit survives the failed or faulty deployment intact.

In a both a proper and a faulty or failed airbag deployment, it is possible that the integrated circuit regulating the airbag deployment will become damaged. The high peak power pulse that is supplied by the power drivers can thermally damage or destroy the integrated circuit. As a result, it becomes more difficult, if not impossible to determine if the integrated circuit caused the failed or faulty deployment. It is therefore desirable to design an integrated circuit that has power drivers that can provide a high peak power pulse for a short period of time without thermally damaging the integrated circuit.

DETAILED DESCRIPTION OF THE PREFERRED EMBODIMENT

Figure 1:
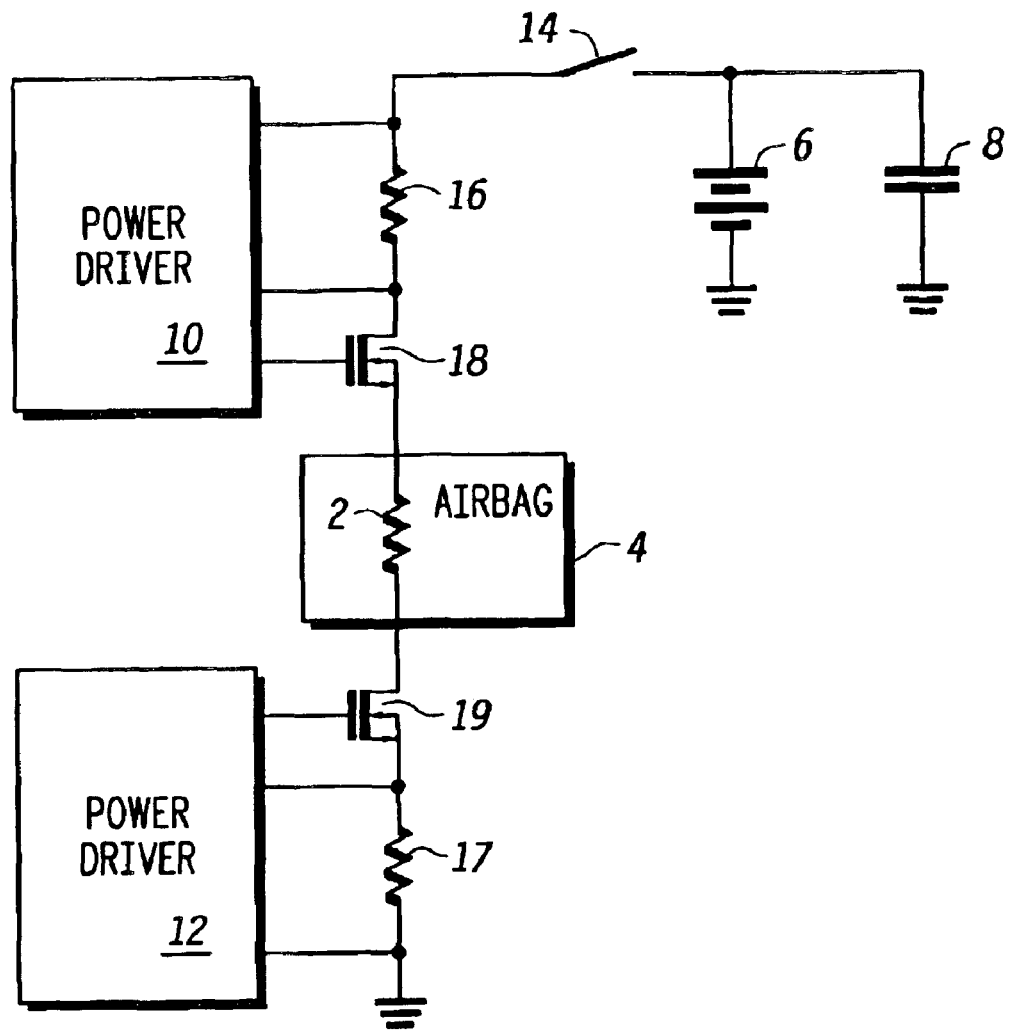
FIG. 1 illustrates a circuit diagram for an airbag deployment system.

There are numerous applications that require a high peak power pulse for a short period of time. A common example of a high peak power pulse application is the deployment of airbags in automobiles. Referring to the drawings by characters of reference, FIG. 1 illustrates a circuit diagram for an airbag deployment system.

The deployment of airbags is triggered through the destructive heating of a wire known as a squib 2. Squib 2, which is physically located inside airbag 4, is destructively heated by passing 1–2 Amperes of current for 1 to 2 msec. The power used to supply this current is provided by car battery 6 or a boosted supply of 20–30V.

Airbag 4 exists to save lives. To ensure that airbag 4 properly deploys, the system that deploys the airbag includes multiple redundancies to guard against anticipated failure points. An example of these redundancies is capacitor 8. Typically, in a car accident, car battery 6 can break away from its base within the engine compartment and become electrically disconnected from the rest of the car electrical system including airbag 4. Storage capacitor 8 is therefore provided to act as a backup power supply in the event that battery 6 becomes damaged or disconnected. The electrical power provided by battery 6 or storage capacitor 8 is regulated by power drivers 10 and 12.

Power driver 10 on the top is called high-side driver 10 and driver 12 on the bottom is called the low-side driver 12. Driver 10 is referred to as the high-side driver 10 due to the fact that it is above squib 2. Driver 12 is referred to as the low-side driver 12 due to the fact that it is below squib 2 in FIG. 1. Low-side driver 12 is generally turned ON fully and acts as a switch turning the current flowing through squib 2

ON and OFF. High-side driver 10 regulates the current in squib 2. Squib 2 has a resistance of 1–2 Ohms. Consequently, there is approximately a 1–4 Volts drop across squib 2. The majority of the power supplied by battery 6 or storage capacitor 8 is dissipated by high-side driver 10 in this configuration.

The peak power levels inside power driver 10 that are used to control the current running through squib 2 may run as high as 80 W for 5 ms. Driver 12 can have 50W of power dissipation for 5 ms during a faulty condition. In spite of this high level of power within drivers 10 and 12, drivers 10 and 12 are capable of simultaneously deploying up to four airbags at a time. The deployment of four airbags simultaneously places the power level within driver 10 at 320 W under normal operation. MOSFETs 12 can have 200 W under faulty condition for four simultaneous deployments. Consequently, driver 10 is commonly referred to as the "HOT" driver and driver 12 is commonly referred to as the "COLD" driver.

The potential supplied by battery 6 or capacitor 8 is controlled by switch 14. Power drivers 10 and 12 sense the current passing from battery 6 or capacitor 8 to squib 2 with sense resistors 16, 17. Drivers 10 and 12 regulate the flow of current through the squib 2 using control FETs (Field Effect Transistors) 18, 19.

Figure 3:
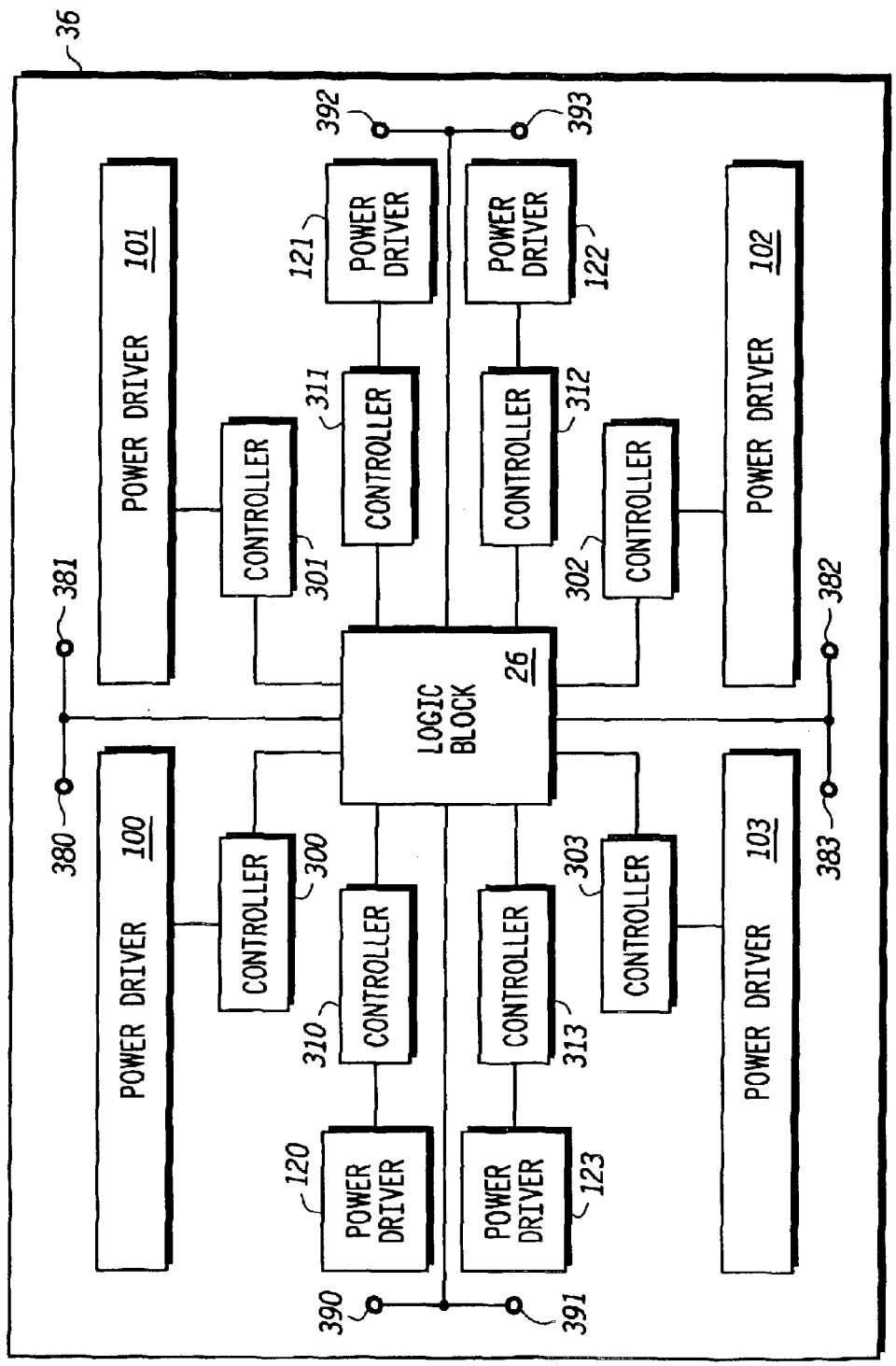
FIG. 3 illustrates a diagram of an integrated circuit and a preferred placement of temperature sensors of the present invention.

Drivers 10 and 12, control FETs 18, 19, and sense resistors 16, 17 are fabricated on an integrated circuit 36, illustrated in FIG. 3. The high power pulses handled by drivers 10 and 12 can cause temperatures within the integrated circuit to exceed 300 degrees Celsius. If this level of temperature continues for an extended period of time, it is possible for the heat generated by drivers 10 and 12 to destroy the integrated circuit illustrated in FIG. 3.

It is desirable to keep the integrated circuit serviceable after the deployment of the airbags. In the event that airbag 4 fails to deploy, or abnormally deploy, it is highly desirable to determine the cause of the failed or abnormal deployment. It is possible that a defect in the airbag deployment system external to the integrated circuit that supports drivers 10 and 12, control FETs 18, 19, and sense resistors 16, 17 could have caused the faulty or abnormal deployment. In addition, it is possible that this external defect could cause drivers 10 and 12 to miss-fire and generate an abnormal amount of heat. This abnormal amount of heat could also destroy the integrated circuit. Through properly diagnosing the cause of a failed or abnormal deployment, it is possible to correct and modify the system to prevent such faults from occurring in the future. If excessive temperatures destroy the integrated circuit, it becomes increasingly difficult, if not impossible to determine if a defect on integrated circuit caused the faulty or abnormal deployment. In order to conduct a full failure analysis, it is desirable to ensure that the integrated circuit is not destroyed by excessive heat produced from drivers 10 and 12.

Drivers 10 and 12 are another example of the redundancies that are provided for safety. It is possible to blow squib 2 and deploy airbag 4 with either driver 10 or driver 12 alone. However, shorts can develop between squib 2 and either driver 10 or 12. If one of these shorts develops, it can prevent either driver 10 or 12 from providing the current necessary to blow squib 2. If only one driver, 10 or 12, was provided to blow squib 2, a single short could disable the driver and prevent the deployment of airbag 4 or inadvertently deploy an airbag 4 if a short occurs to battery 6 at point 32 or a short to ground occurs at point 34. Through providing two drivers, 10 and 12, that can each independently deploy airbag 4, the overall airbag system is less vulnerable to a single short and is more reliable.

Figure 2:
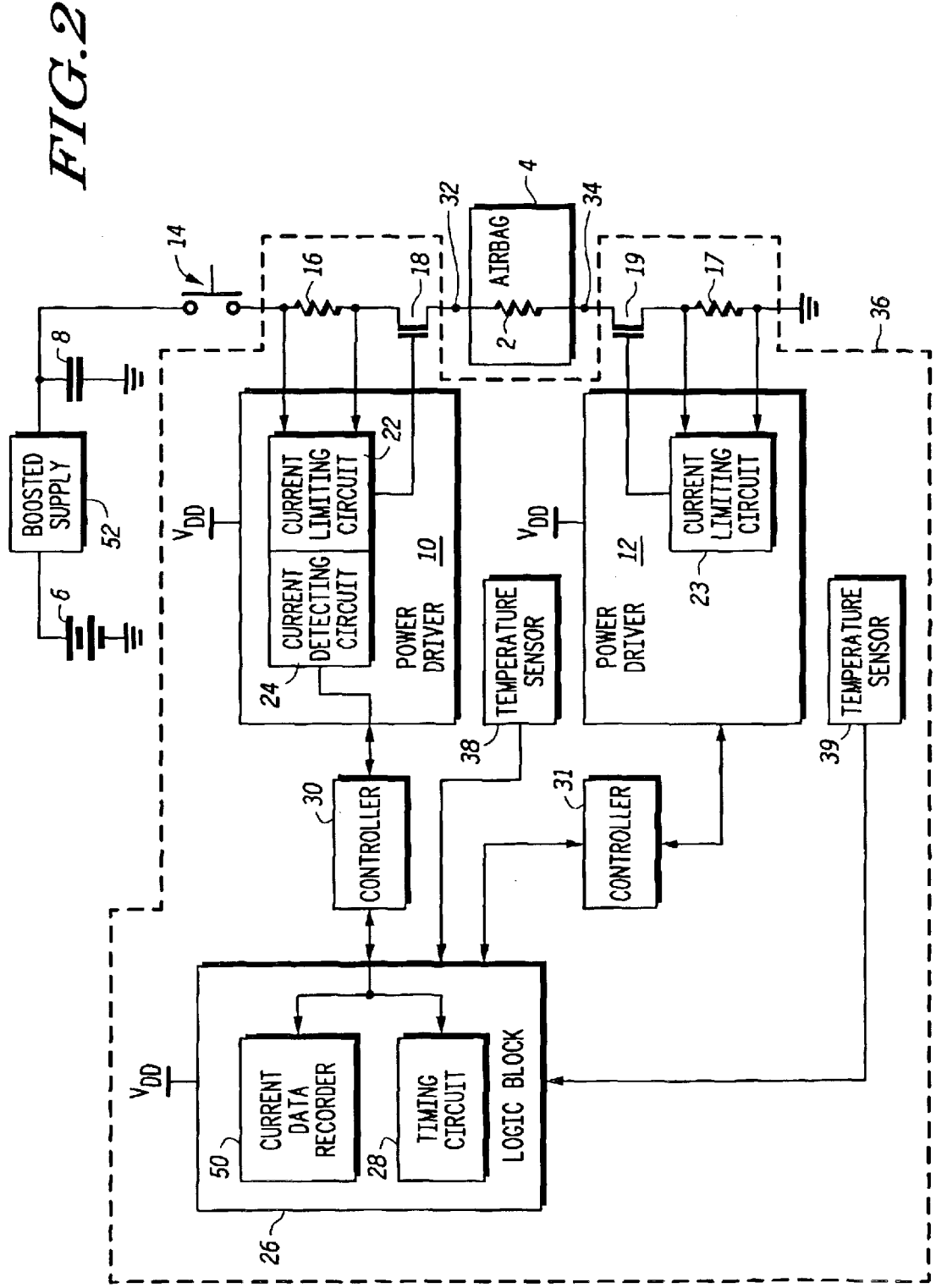
FIG. 2 illustrates a block diagram of a preferred embodiment of the present invention.

FIG. 2 illustrates a block diagram of a preferred embodiment of the present invention. In the event that battery 6 becomes electrically disconnected from the airbag system, storage capacitor 8 is provided as a backup power source. Capacitor 8 is physically positioned near the integrated circuit that supports drivers 10 and 12 to ensure that it is not at risk from becoming disconnected from the overall airbag system in an accident like battery 6. Capacitor 8 typically has a capacitance of 1000 to 8000 micro-Farads. Switch 14, an optional safety switch, is provided to couple battery 6 and capacitor 8 to the rest of the airbag system. Switch 14 mechanically closes during a crash event.

Driver 10 includes a current limiting circuit 22 and a current detecting circuit 24. The current limit of high side driver 10 is set lower than the current limit of low side driver 12. Through using current sense resistor 16 and control FET 18, current limiting circuit 22 regulates the amount of current flowing to squib 2. It is possible for either battery 6 or capacitor 8 to provide a current pulse that would damage driver 10. The function of current limiting circuit 22 is to restrict the level of current flowing to squib 2 to a level that will not damage driver 10 in the duration it takes to blow squib 2. Driver 12 includes a current limiting circuit 23. Sense resistor 17, control FET 19, and current limiting circuit 23 regulate the amount of current flowing through driver 12.

To pass current through squib 2, both control FETs 18, 19 are turned ON. Both drivers 10 and 12 are coupled to a logic block 26 that includes a timing circuit 28. When current detecting circuit 24 detects a desired level of current passing through sense resistor 16, it sends an output to timing circuit 28 in logic block 26. Timing circuit 28 marks a desired duration of time. At the expiration of this desired duration of time, timing circuit 28 sends an output to logic block 26. Controllers 30 and 31 are provided to couple logic block 26 to drivers 10 and 12. Controllers 30 and 31 function to regulate the operation of drivers 10 and 12.

During the lifespan of the airbag system depicted in FIG. 2, short circuits can develop that affect the operation of the system. In an automobile, primarily two types of short circuits exist. Due to the amount of steel in a car, a short to the car frame or chassis is effectively a short to ground. Alternatively, a large number of electrical wires and cables in the car are connected to the battery. Coming into contact with these battery connected wires can cause a short to the battery. Overtime, the wires connecting the various components of the airbag system may become frayed and come into contact with the car frame or a wire connected to the battery shorting parts of the airbag system.

Providing two drivers, 10 and 12, for the airbag deployment system is another example of a redundancy provided for safety and reliability. There is a potential for short circuits to occur in the airbag system of FIG. 2. Referring to FIG. 2, shorts may develop at a squib high location 32, or a squib low location 34. Squib high location 32 is the wire that is external to integrated circuit 36 that connects driver 10 on integrated circuit 36 to squib 2. The wire at squib high location 32 can become frayed during its lifetime and come into contact with the steel car frame or wires connected to battery 6. Consequently, squib high location 32 can become shorted either to ground or to battery 6. In the event that squib high location 32 is shorted to battery 6, driver 10 becomes neutralized and cannot deploy squib 2. However, driver 12 is still operable and can deploy squib 2 when squib high location 32 is shorted and driver 10 is neutralized.

Squib low location 34 is the wire that is external to integrated circuit 36 that connects driver 12 on integrated circuit 36 to squib 2. The wire at squib low location 34 can become frayed during its lifetime and come into contact with the steel car frame or wires connected to battery 6. Consequently, squib low location 34 can become shorted either to ground or to battery 6. In the event that squib high location 34 is shorted to ground, driver 12 becomes neutralized and cannot deploy squib 2. However, driver 10 can still function and deploy squib 2 when squib low location is shorted to ground. If squib low location 34 becomes shorted to battery 6, it is still possible to deploy squib 2. While squib low location 34 is shorted to battery 6, driver 10 provides a boosted level of voltage over that of battery 6 that is supplied through FET 18 by a boosted power supply 52. Consequently, driver 10 can still deploy squib 2 when squib low location 34 is shorted to battery 6. As a result, through providing 2 drivers, 10 and 12, it is possible to ensure that the airbag system still functions and can deploy squib 2 for the above mentioned short circuit conditions. However, when squib high location 32 is shorted to ground, there is no voltage across squib 2 and neither driver 10 nor 12 can deploy squib 2.

Drivers 10 and 12, logic block 26, controllers 30, 31, sense resistors 16, 17, and control FETs 18, 19 are all fabricated on a single integrated circuit 36 illustrated in FIG. 3. FIG. 3 illustrates a block diagram of integrated circuit 36 and a preferred placement of a temperature sensor 38 and 39 illustrated in FIGS. 2 and 3. There are eight temperature sensors 38 and 39 illustrated in FIG. 3, labeled individually as 380–383 and 390–393. Temperature sensor 38 is positioned near high-side driver 10. Temperature sensor 39 is placed near low-side driver 12. Sensors 380–383 are positioned near high-side drivers 100–103 in FIG. 3. Sensors 390–393 are positioned near low-side drivers 120–123 in FIG. 3. The heat produced by drivers 10, identified individually as 100, 101, 102, and 103, and drivers 12, identified individually as 120, 121, 122, and 123 during an airbag deployment is confined to the volume of integrated circuit 36 due to its standard low cost plastic case and epoxy attachment. The airbag application is generally controlled by four high-side drivers 10, identified individually as 100, 101, 102, and 103, and four low-side drivers 12, identified individually as 120, 121, 122, and 123. Drivers 100, 101, 102, and 103 are controlled by controllers 300, 301, 302, and 303 respectively. Drivers 120, 121, 122, and 123 are controlled by controllers 310, 311, 312, and 313 respectively.

In order to protect drivers 100–103 and 120–123 and integrated circuit 36 from thermal damage, temperature sensors 380–383 and 390–393, illustrated in more detail in FIG. 3, are employed in combination with current detecting circuit 24 and timing circuit 28 to regulate the operation of drivers 10 and 12, as illustrated in FIG. 2. Temperature sensors 380–383 and 390–393 provide an output when the temperature of integrated circuit 36 reaches one of two desired levels. Temperature sensors 380–383 and 390–393 provides an output to logic block 26 whenever the temperature within integrated circuit 32 reaches either a maximum or a minimum temperature level. In this manner, temperature sensors 380–383 and 390–393 provide a hysteresis loop for the temperature fluctuations on integrated circuit 36. Each controller 300–303 and 310–313 is coupled to and regulated by logic block 26. Temperature sensors 380–383 and 390–393 are coupled to logic block 26.

Temperature sensors 380–383 and 390–393 are strategically located near power drivers 100–103 and 120–123 such that they respond to the temperature fluctuations of drivers 100–103 and 120–123. Note that temperature sensors 380–383 and 390–393 are not placed directly on the drivers 100–103 and 120–123 due to the fact that the thermal energy produced by drivers 100–103 and 120–123 is at a maximum level at the direct location of drivers 100–103 and 120–123. The peak temperature of the power transistors within drivers 100–103 and 120–123 can exceed 300 degrees Celsius. Simple and economical temperature sensing circuits and monitors are typically designed to operate within a temperature range of 150 degrees Celsius to 190 degrees Celsius. It is not practical to design a temperature sensing circuit that can operate at this elevated temperature.

In order to measure the temperature fluctuations of drivers 100–103 and 120–123 with a standard temperature monitoring circuit, it is desirable to employ a thick semiconductor wafer to form integrated circuit 36. In order for temperature sensors 380–383 and 390–393 to accurately sense a temperature fluctuation proportional to the temperature fluctuations occurring in drivers 100–103 and 120–123, integrated circuit 36 has a substrate with a volume that can absorb a sufficient amount of thermal energy from drivers 100–103 and 120–123 to reflect the temperature fluctuations in drivers 100–103 and 120–123. In the present invention, a wafer thickness of 25 mils or greater is desirable. Wafers that are thin have a smaller volumetric thermal capacity.

This thermal energy produced by drivers 100–103 and 120–123 propagates through the crystalline lattice of integrated circuit 36 raising the temperature throughout integrated circuit 36. This thermal propagation of energy is affected by the boundary conditions of the integrated circuit 36 system. The ideal location for temperature sensors 380–383 and 390–393 is a position where the temperature is at a level below the peak temperature of drivers 100–103 and 120–123 where a simple circuit can operate. It is technically possible to design circuits that can sense and track the elevated temperatures occurring within drivers 100–103 and 120–123. However, it is neither cost effective nor trivial to implement such robust circuits. It is highly desirable to the standard temperature sensors 380–383 and 390–393 due to their simple design and low cost. As a result, temperature sensors 380–383 and 390–393 are placed at a distance from drivers 100–103 and 120–123 where sufficient heat has dissipated to where temperature sensors 380–383 and 390–393 can detect the temperature fluctuations of drivers 100–103 and 120–123 at an overall lower temperature level.

An optimal location for temperature sensors 380–383 and 390–393 is also a position that has a temperature fluctuation that closely follows the temperature fluctuations of drivers 100–103 and 120–123. A preferred location for temperature sensors 380–383 and 390–393 is illustrated in FIG. 3. At this position, temperature sensors 380–383 and 390–393 can track the temperature fluctuations of drivers 100–103 and 120–123 at a lower temperature level at which temperature sensors 380–383 and 390–393 can function.

The thermal profile of integrated circuit 36 is dependent on the power dissipation and operating conditions of integrated circuit 36. The largest temperature gradients are observed during short pulse durations that dissipate the greatest power density. Short pulses of energy are confined to the region of integrated circuit 36 near drivers 100–103 and 120–123. This confinement is due primarily to the fact that the thermal flow is blocked by the low-cost standard epoxy die attachment. During a current pulse, the edges of integrated circuit 36 have a higher amount of thermal energy and therefore reach higher temperatures than the interior of integrated circuit 36. Further, the edges of integrated circuit 36 experience a broader range of temperature fluctuations than the interior of integrated circuit 36. Consequently, the optimal location for standard temperature sensors 380–383 and 390–393 on integrated circuit 36 is illustrated on FIG. 3 as near the edges of integrated circuit 36 by drivers 100–103 and 120–123.

Figure 4:
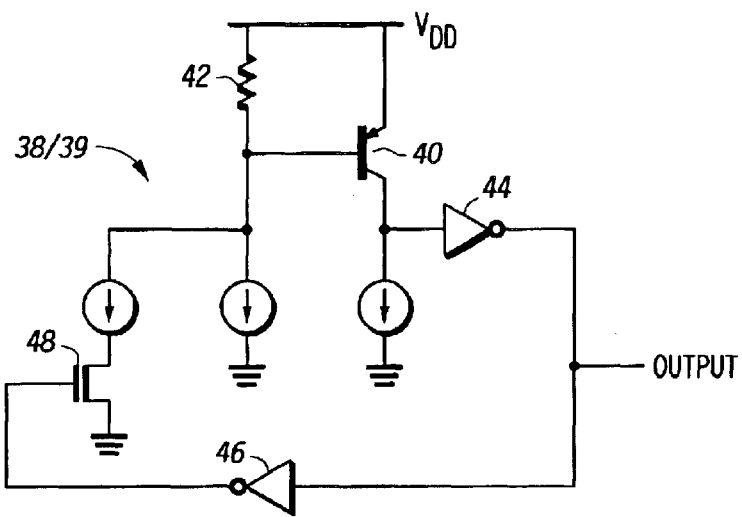
FIG. 4 illustrates a temperature sensing circuit of a preferred embodiment of the present invention.

FIG. 4 illustrates temperature sensor 38/39 of a preferred embodiment of the present invention. Temperature sensor 38/39 is formed from a simple transistor circuit. The base emitter voltage ($V_{BE}$) of transistor 40 varies by −2 mV/C.°. In addition, resistor 42 has a temperature variation of 100 ppm/C.°. As the temperature increases and decreases within integrated circuit 36, $V_{BE}$ of transistor 40 changes proportionally. Temperature sensor 38/39 provides an output at both a desired maximum and desired minimum temperature level in a hysteresis loop. Temperature sensor 38/39 determines when the temperature in integrated circuit 36 has reached a maximum value with gate 44. Gate 44 is triggered to provide an output at the level of $V_{BE}$ of transistor 40 that corresponds to the desired maximum temperature level. Once the temperature reaches this maximum temperature value, gate 46 provides an output to FET 48 to set a desired minimum temperature level. When the temperature in integrated circuit 36 reaches the desired minimum temperature level, gate 44 is triggered to provide an output. Again, after gate 44 provides an output corresponding to the occurrence of reaching the minimum temperature level, gate 46 and FET 48 re-bias temperature sensor 38/39 to trigger an output on gate 44 for the desired maximum temperature level. In this manner, gate 46 and FET 48 provide a hysteresis loop for temperature sensor 38/39. As a result, temperature sensor 38/39 provides an output for the desired maximum and minimum temperature levels of integrated circuit 36 in a temperature hysteresis loop.

Figure 5:
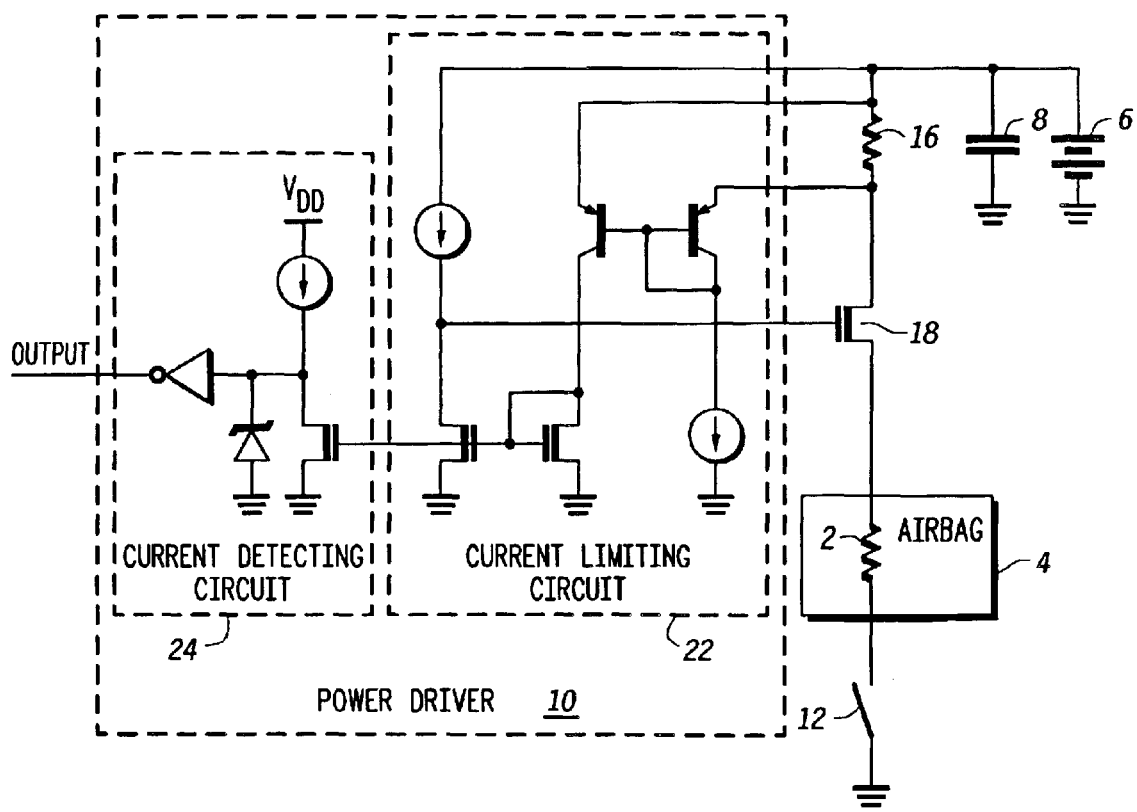
FIG. 5 illustrates a circuit diagram of a high-side driver of a preferred embodiment of present the invention.

FIG. 5 illustrates a circuit diagram of a high-side driver of a preferred embodiment of the invention. High-side driver 10 is depicted as having current detecting circuit 24 and current limiting circuit 22. Current detecting circuit 24 provides an output to logic block 26 when the current in sense resistor 16 reaches a desired level. This output triggers timing circuit 28 to mark a desired period of time. Current limiting circuit 22 regulates the flow within control FET 18 to a level such that it will not damage driver 10. Battery 6 and capacitor 8 provide the potential energy used to thermally destroy squib 2. In this figure, low-side driver 12 is shown as a switch due to the fact that driver 12 primarily functions as a switch in the overall airbag system.

The airbag system of the present invention protects integrated circuit 36 from thermal damage caused by drivers 10 and 12 through the use of current detecting circuit 24, timing circuit 28, and temperature sensors 38 or 39. When the current level in sense resistor 16 reaches a desired level sufficient to blow squib 2, current detecting circuit 24 is triggered and provides an output to logic block 26. Logic block 26 activates timing circuit 28. Timing circuit 28 then marks a period of time that corresponds to an amount of time that is needed for the current in sense resistor 16 to thermally destroy squib 2. A period of 5 milli-seconds is an exemplary period of time. At the expiration of this time period, timing circuit 28 provides an output to logic block 26. In parallel, temperature sensors 38 or 39 detect the temperature within integrated circuit 36 at the locations near drivers 10 and 12 illustrated in FIG. 3. When the temperature in integrated circuit 36 reaches a maximum level, temperature sensors 38 or 39 provide an output to logic block 26. In a preferred embodiment, logic blocks regulates the operation of drivers 10 and 12 based on time and temperature. In a preferred embodiment, when logic block 26 receives both 1) the output from timing circuit 28 signifying that the measured time period is over and 2) the output from temperature sensors 38 or 39 that integrated circuit 36 has reached the maximum temperature level, then logic block 26 turns drivers 10 and 12 OFF. In this manner, logic block 26 has prevented drivers 10 and 12 from over heating integrated circuit 26 and from possibly thermally destroying it.

After drivers 10 and 12 are shut down, drivers 10 and 12 are no longer producing thermal energy that propagates through integrated circuit 36. Consequently, the temperature of integrated circuit 36 decreases. Once temperature sensor 38 or 39 reaches the maximum temperature level and sends the output to logic block 26 indicating as such, temperature sensor 38 or 39 is reset to detect the minimum temperature level through gate 46 and FET 48 illustrated in FIG. 4. Once the temperature within integrated circuit 36 reaches this minimum temperature level, temperature sensor 38 or 39 sends another output to logic block 26 indicating as such. Now that the temperature level within integrated circuit 36 has decayed to a safe level where drivers 10 and 12 can operate without thermally damaging integrated circuit 36, logic block 26 enables drivers 10 and 12 to function again.

In an alternative embodiment, logic block 26 shuts down drivers 10 and 12 when it receives the output from temperature sensors 38 or 39 indicating that integrated circuit 36 has reached the maximum temperature level. In this embodiment, logic block 26 shuts driver 10 and 12 down based on temperature alone. Logic block 26 does not utilize timing circuit 28 in this embodiment. Shutting down integrated circuit 36 based on temperature alone has the advantage of thermally protecting integrated circuit 36 from thermal damage while using less circuitry. However, shutting down drivers 10 and 12 based on temperature alone may prevent drivers 10 and 12 from providing a current pulse sufficient to destroy squib 2. Once drivers 10 and 12 are activated to provide a current pulse to squib 2 for its thermal destruction, the temperature within integrated circuit 36 may rise fast enough such that temperature sensor 38 or 39 is triggered at its maximum temperature level prior to the thermal destruction of squib 2. Consequently, logic block 26 would shut down drivers 10 and 12 prior to the thermal destruction of squib 2. As a result, logic block 26 would have failed to deploy the airbag. Subsequently, this embodiment is not preferred. The purpose of timing circuit 28 in the preferred embodiment is to ensure that temperature sensors 38 or 39 do not prematurely shut down drivers 10 and 12 prior to the thermal destruction of squib 2.

In another alternative embodiment, logic block 26 regulates the operation of drivers 10 and 12 based upon the output of timing circuit 28 alone. In this embodiment, once the current level in sense resistor 16, 17 reaches a desired level sufficient to blow squib 2, current detecting circuit 24 is triggered and provides an output to logic block 26. Logic block 26 activates timing circuit 28. Timing circuit 28 then marks a period of time that corresponds to an amount of time that is needed for the current in sense resistor 16, 17 to thermally destroy squib 2. A period of 5 milli-seconds is an exemplary period of time. At the expiration of this time period, timing circuit 28 provides an output to logic block 26. Once logic block 26 receives this output, it shuts driver 10 and 12 down. Timing circuit 28 then marks a second period of time that corresponds to the duration of time needed for integrated circuit 36 to cool down to a desired temperature. At the expiration of that time period, logic block 26 reactivates drivers 10 and 12 for further airbag deployments. One reason for not using the temperature sensors 38 or 39 is cost. Through reducing the number of circuits and components on integrated circuit 36, it is possible to reduce the size and cost of integrated circuit 36, both in terms of time to design and manufacturing processes. Further, through conducting extensive thermal modeling of integrated circuit 36, it is possible to accurately predict the thermal response of the system based upon the firing time of drivers 10 and 12. Consequently, it is possible to program timing circuit 28 to regulate the firing times of drivers 10 and 12 through logic block 26 in order to prevent thermal damage to the system without actually measuring the temperature of integrated circuit 36.

Once drivers 10 and 12 are deactivated from providing any further current pulses to deploy squib 2, the temperature level in integrated circuit 36 begins to decay. The temperatures of low-side drivers 12 drop by almost 50 percent within 30 ms following 20 ms of constant powering at 50W. When high-side drivers 10 are powered at 80W for 5 ms, the temperature decays significantly within 0.1 sec.

As noted earlier, it is not uncommon for airbag systems to malfunction. For instance, the wiring harness connected to the airbags can become damaged. In addition, over time, short circuits and open circuits can occur. All of these defects can prevent the proper deployment of the airbag. It is not uncommon for both proper and failed airbag deployments to thermally destroy integrated circuit 36 in the process. In a failed airbag deployment, it is highly desirable to determine the cause of the failed deployment. A comprehensive failure analysis requires that integrated circuit 36 survive the thermal stresses of the airbag deployment. Through temperature sensors 38 or 39, current limiting circuit 22, current detecting circuit 24, and timing circuit 28, the present invention protects integrated circuit 36 from thermal destruction. As a result, it is possible to conduct a failure analysis on integrated circuit 36 and determine if it was the cause of the faulty airbag deployment.

A preferred embodiment of the present invention further facilitates post-failure analysis through a current data recorder 50 provided in logic block 26. Current data recorder 50 records information on the current flowing through sense resistor 16, 17 into squib 2. As a result, after a failed airbag deployment, it is possible to download the information data from pulse data recorder 50 to determine whether drivers 10 and 12 provided a sufficient pulse of current to thermally deploy squib 2. In this manner, it is possible to determine if integrated circuit 36 is the cause of the failed airbag deployment.

One advantage of the present invention is cost. The design of integrated circuit 36 is constrained by cost and die size. It is highly desirable to develop an inexpensive plastic package that optimizes the circuit design such that the size of drivers 10 and 12 and integrated circuit 36 is minimized. The present invention enables the optimization of drivers 10 and 12 and integrated circuit 36 through providing timing circuit 28, current limiting circuit 22, current detecting circuit 24, and temperature sensors 38 or 39. In this manner, it is possible to reduce the overall size of drivers 10 and 12 and integrated circuit 36.

A further advantage of the present invention relates to the development and testing of airbag control systems fabricated on an integrated circuit 36. In the laboratory, it is highly desirable to run repeated high peak power pulses for short period of times through drivers 10 and 12 in order to determine the performance of the system. In performing these performance tests, it is highly desirable to create a test scheme that does not thermally damage integrated circuit 36 from repeated high peak power pulses. The present invention facilitates a demanding test program for integrated circuit by providing a thermal protection system that manages the thermal energy within integrated circuit 36 with providing timing circuit 28, current limiting circuit 22, current detecting circuit 24, and temperature sensors 38 or 39 to allow repeated driver 10 and 12 current pulse firing.

Although the present invention has been described in detail, it will be apparent to those of skill in the art that the invention may be embodied in a variety of specific forms and that various changes, substitutions, and alterations can be made without departing from the spirit and scope of the invention. The described embodiments are only illustrative and not restrictive and the scope of the invention is, therefore, indicated by the following claims.

We claim:

1. A thermal protection system for an integrated circuit supporting a power driver, comprised of:
   a thermal sensor placed along an edge of said integrated circuit next to said power driver to detect a temperature level near said power driver;
   a current detecting circuit coupled to said power driver to detect a current level in said power driver;
   a current limiting circuit coupled to said power driver to limit said current level in said power driver;
   a logic block to regulate said power driver, wherein said logic block is coupled to said thermal sensor, said power driver, and said current detecting circuit; and
   a timing circuit coupled to said logic block, wherein said logic block receives a first output from said timing circuit and a second output from said thermal sensor.

2. The system of claim 1, further comprising a current data recorder to record current data from said power driver.

3. The system of claim 2, wherein said timing circuit receives a current input from said current detecting circuit.

4. The system of claim 1, further comprising a controller coupled to said logic block and said power driver in between said logic block and said power driver, wherein said controller regulates the operation of said power driver.

5. The system of claim 1, wherein said logic block deactivates said power driver when said logic block receives said first output.

6. The system of claim 1, wherein said logic block deactivates said power driver when said logic block receives said second output.

7. The system of claim 1, further comprising a semiconductor wafer with a thickness to absorb a sufficient amount of thermal energy from said power driver to enable said thermal sensor to detect a variation of said temperature level near said power driver, said semiconductor wafer supports said power driver and said logic block.

8. A method for thermally protecting a power device on an integrated circuit, comprising the steps of:
   activating a power driver to deploy a current;
   sensing said current flowing through said power driver;
   providing a first output to a logic block when said current reaches a desired level;
   activating a timing circuit;
   measuring a length of time;
   providing a second output at the expiration of said length of time to said logic block; and
   deactivating said power driver.

9. The method of claim 8, further comprising the steps of:
   measuring a second length of time;
   providing a third output at the expiration of said second length of time to said logic block; and
   reactivating said power driver.

10. The method of claim 8, further comprising the steps of;

providing a fourth output to said logic block when a temperature of said integrated circuit reaches a maximum level.

11. The method of claim 10, wherein deactivating said power driver occurs when said logic block has received both said second output and said fourth output.

12. The method of claim 11, further comprising the steps of:

providing a fifth output to said logic block when the temperature of said integrated circuit reaches a minimum level; and reactivating said power driver.

13. The method of claim 8, further comprising the step of recording a data on said current pulse.

14. The method of claim 8, further comprising the step of regulating said current in said driver with a current limiting circuit.

15. A thermal protection system for an airbag deployment system, comprised of:

current limiting means to regulate a flow of a current through a power driver;

timing means to mark a period of time and provide a timing output at an expiration of said time period;

current detecting means to provide a first output when said current in said power driver reaches a desired level;

triggering means to activate said timing means when said current reaches said desired level based upon said first output;

logic means to turn said power driver OFF when said logic means receives said timing output.

16. The thermal protection system of claim 15, further comprising memory means to record data on said current flowing through said power driver.

17. The thermal protection system of claim 15, further comprising temperature sensing means positioned along an edge of an integrated circuit next to a power driver to sense a temperature within said power driver, wherein said temperature sensing means is coupled to said logic means.

18. The thermal protection system of claim 17, wherein said temperature sensing means provides a first temperature output to said logic means when said temperature reaches a maximum level.

19. The thermal protection system of claim 17, wherein said temperature sensing means provides a second temperature output to said logic means when said temperature reaches a minimum level.

20. The thermal protection system of claim 19, wherein said logic means to turn said power driver OFF when said logic means receives said timing output and said first temperature output.

21. The thermal protection system of claim 20, wherein said logic means turns said power driver ON when said logic means receives said second temperature output.

* * * * *